United States Patent [19]

Latsko

[11] E Patent Number: Re. 33,576

[45] Reissued Date of Patent: Apr. 23, 1991

[54] COUPLING ASSEMBLY AND FRICTION SHOE THEREFOR

[75] Inventor: James M. Latsko, North Royalton, Ohio

[73] Assignee: Eaton Corporation, Cleveland, Ohio

[21] Appl. No.: 384,146

[22] Filed: Jul. 21, 1989

Related U.S. Patent Documents

Reissue of:

[64] Patent No.: 4,795,013
Issued: Jan. 3, 1989
Appl. No.: 40,507
Filed: Apr. 20, 1987

[51] Int. Cl.[5] ..... F16D 25/04; F16D 13/10; F16D 69/04

[52] U.S. Cl. ..... 192/88 B; 192/79; 192/85 AT; 192/107 T; 188/250 G; 188/366

[58] Field of Search ..... 192/79, 85 AT, 88 B, 192/107 T; 188/365, 366, 367, 250 G, 250 A, 250 B

[56] References Cited

U.S. PATENT DOCUMENTS

| | | | |
|---|---|---|---|
| 1,867,348 | 7/1932 | Blume | 188/250 G X |
| 2,083,989 | 6/1937 | Eisenhardt | 188/250 G X |
| 2,673,573 | 3/1954 | Fawick | 192/88 B X |
| 3,022,877 | 2/1962 | Fawick | 192/88 B |
| 3,064,769 | 11/1962 | Billmeyer | 192/107 T X |
| 3,092,231 | 6/1963 | Kneuss | 192/88 B X |
| 4,190,136 | 2/1980 | Collins et al. | 192/88 B X |
| 4,453,621 | 6/1984 | Warwick et al. | 188/250 G |
| 4,552,257 | 11/1985 | Witt | 192/88 B X |

FOREIGN PATENT DOCUMENTS

| | | | |
|---|---|---|---|
| 721603 | 3/1980 | U.S.S.R. | 192/88 B |

*Primary Examiner*—Richard Lorence
*Attorney, Agent, or Firm*—Tarolli, Sundheim & Covell

[57] ABSTRACT

A coupling assembly which includes an inflatable annular tube, a plurality of friction shoes removably attached to the tube so that the shoes move radially as the tube is inflated and deflated. The shoes include a friction pad bonded to one side of a backing plate and a driving bar also made of friction material bonded to the other side of the backing plate and joined together in a unitary structure. The driving bars fit into grooves formed in the tube to improve torque transfer between the shoes and the tube.

14 Claims, 2 Drawing Sheets

COUPLING ASSEMBLY AND FRICTION SHOE THEREFOR

Matter enclosed in heavy brackets [ ] appears in the original patent but forms no part of this reissue specification; matter printed in italics indicates the additions made by reissue.

This invention relates to a coupling assembly functioning as a brake or clutch, comprising a drum, a set of circumferentially arranged friction shoes and an annular, fluid extensible tube or bladder element for radially actuating the shoes. More particularly, the invention relates to an assembly having a series of shoes each having a driving bar formed intricately on each shoe which coacts with corresponding grooves formed in the tube.

Collins et al. U.S. Pat. No. 4,190,136 and Fawick U.S. Pat. No. 3,022,877 disclose clutch and brake assemblies which utilize a series of shoes attached to and radially actuated by a fluid extensible tube. However, the shoes in these patents are formed of a backing plate having transverse openings for cooling and a friction pad riveted to the backing plate in substantial spaced relationship to the tube element. Projections on the tube extend into grooves formed in the backing plate for transferring torque from the shoes to the tube.

An object of this invention is to provide a new and improved coupling assembly of the character described having a plurality of friction shoes each of which is made of a backing plate with a friction pad secured to one side and a driving bar secured to the other side of said plate and also formed integrally with the plate and pad. Each driving bar is received in a corresponding groove in the tube element for improved transfer of torque from the shoe to the tube element.

Another object of the invention is to provide a friction shoe for a coupling of the character described having a backing plate with a friction pad secured to one side thereof and a driving bar formed of friction material secured centrally to the other side of said backing plate and additional driving bar means located at each end of said backing plate which may be formed in part of friction material for improved torque transfer from the shoe to the tube element.

Another object of the invention is to provide an improved friction shoe for a coupling assembly of the character described, providing simplicity, economy and durability of construction, and facilitating replacement and repair thereof.

Figure 1:
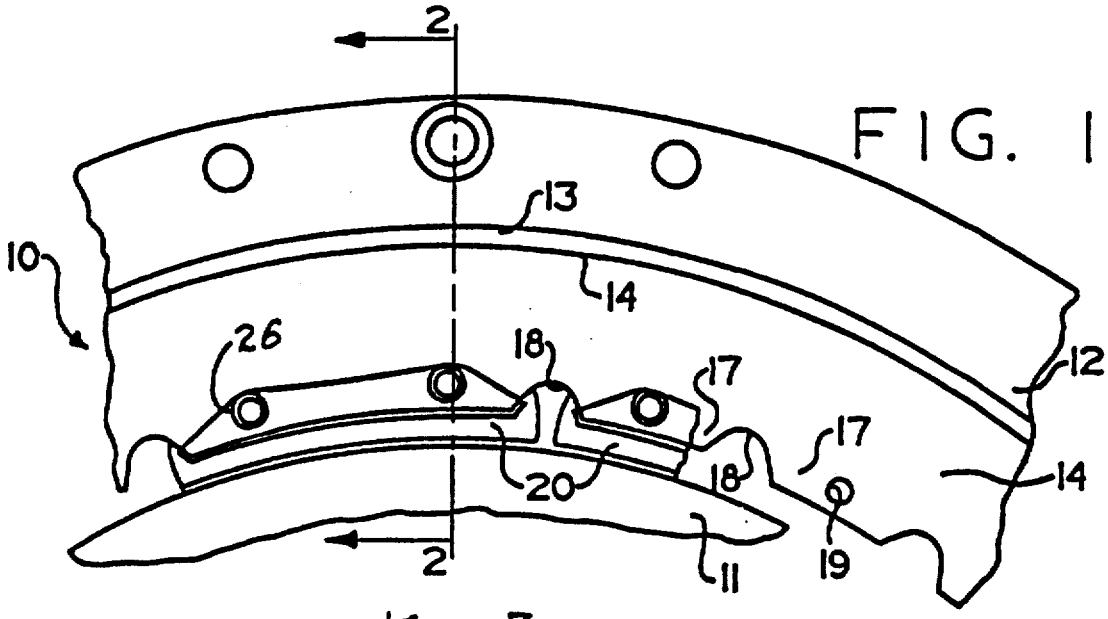
FIG. 1 is a fragmentary side view of the clutch and brake assembly of this invention with parts broken away.
Figure 2:
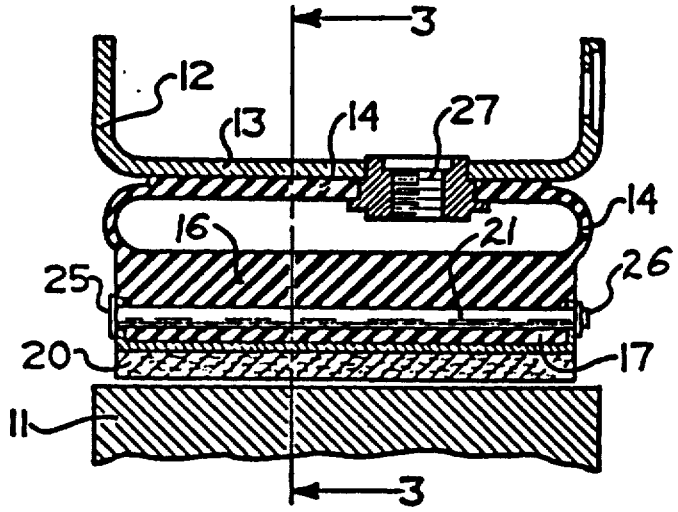
FIG. 2 is a sectional view taken along the lines 2—2 of FIG. 1.
Figure 3:
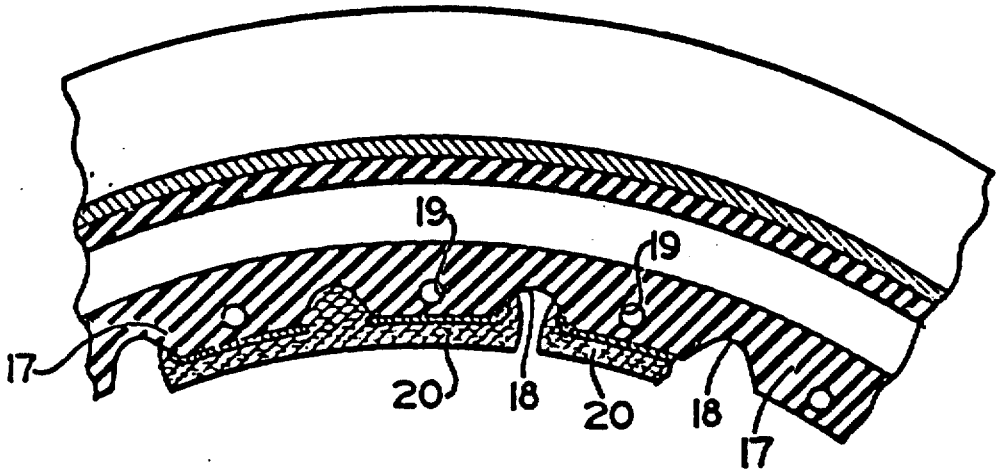
FIG. 3 is a sectional view taken along the lines 3—3 of FIG. 2.

Referring to the drawings, the coupling 10 includes a drum 11 and a rim assembly 12. The drum 11 and rim assembly 12 are rotatable relative to each other about an axis of rotation. The coupling 10 can be used as a brake or a clutch. If it is desired to use the coupling 10 as a brake, one of the members 11 or 12 will be fixed and if is desired to use a coupling 10 as a clutch, both of the members 11 and 12 will be rotatable. Accordingly, the term coupling as used herein will refer to either a clutch or a brake assembly.

An annular fluid expandable tube or bladder element 14 made of reinforce elastomer is secured to the annular surface 13 of the rim assembly 12. The wall 16 of the tube 14 is formed of a thick layer of elastomer having a series of axially extending lugs 17 formed therein by axially extending grooves 18 which are preferably arcuate in shape in cross section. The grooves 18 are equally spaced apart around the circumference of the tube. Each of the lugs 17 includes an axially extending hole 19 for purposes hereinafter discussed.

A plurality of shoe members 20 are connected to the wall 16 of the tube by pins 21 which extend through the holes 19 in the tube and through pairs of aligned holes 22 in the side flanges 23 of the backing plate 24 of the shoes 20. The pins 21 are preferably provided with a suitable heat 25 at one end and a removable head 26 at the other end to permit any given shoe to be removed from the tube for replacement. It is seen that each lug 17 includes a single hole 19 so that each shoe member 20 is supported by a pair of lugs 17 and by a pair of pins 21 extending through adjacent holes 19 in adjacent lugs 17.

The tube element 14 includes an inlet 27 which communicates with the interior of the tube element 14 to permit pressurized fluid to be injected into the tube element causing the movement of the wall 16 in a radial direction so that the friction shoes 20 are moved into contact with the outer surface of the drum 11 to thereby couple the drum 11 and the rim assembly 12 in a well known manner. When pressurized fluid is released from the interior of the tube 14 the tube will deflate and the friction shoes 20 will move radially to disengage from the drum 11 to thereby uncouple the drum 11 and the rim assembly 12.

Figure 4:
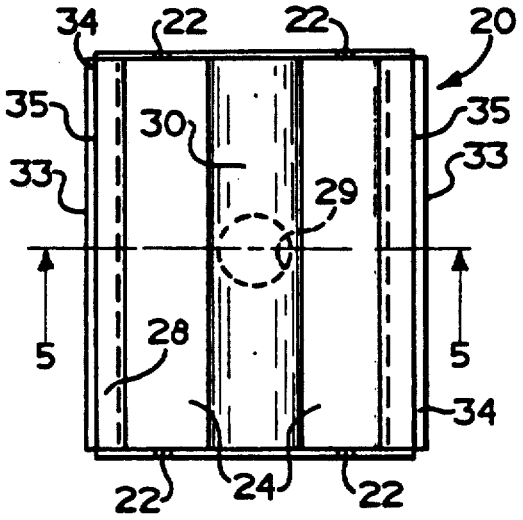
FIG. 4 is a top view of the shoe member.
Figure 5:
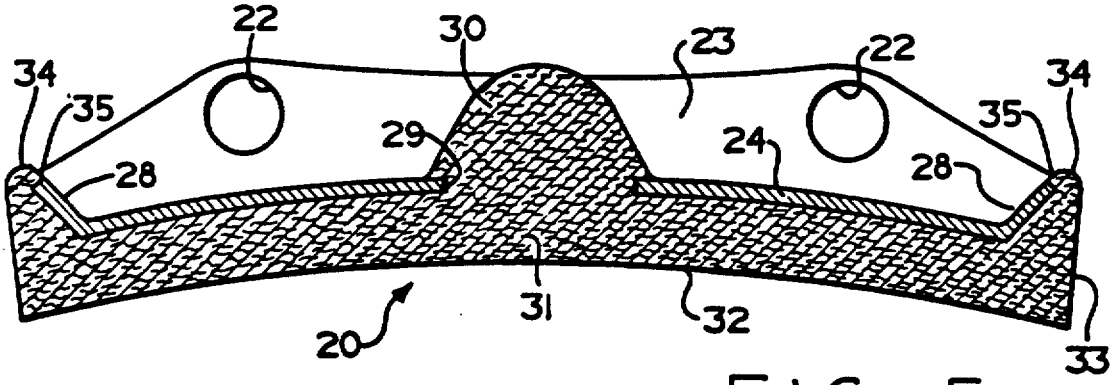
FIG. 5 is an enlarged view taken along the line 5—5 of FIG. 4.

In accordance with the invention, the shoe members 20 have been designed to maximize the torque carrying capacity of the coupling and to provide an economical replaceable shoe construction. Referring to FIGS. 4 and 5, the side flanges 23 and backing plate 24 are preferably made of metal and the latter is generally arcuate in shape in a direction circumferentially of the drum 11. The ends 28 of the backing plates 24 extend at a angle to the backing plate 24 and may be connected to the ends of the shoe flanges 23. At least one hole 29 is provided, preferably in a circumferentially central location, in the backing plate 24. Although the hole is shown as circular in shape, one or more holes may be provided of rectangular or other shapes since the purpose of the hole 29 is to permit the friction material, when making the shoe member 20, to flow into the mold cavity forming the driving bar 30 while the friction pad 31 is formed. The driving bar 30 extends generally axially to the shoe member 20 preferably from one side flange 23 to the other. Friction material exists in the hole 29 joining the driving bar 30 with the friction pad 31 and with the backing plate 24. As shown in FIGS. 4 and 5, the radial dimension or thickness of the driving bar 30 and the friction pad 31 are both substantially larger than the thickness of the metal backing plate 24.

The ends 33 of the shoe member 20 are preferably formed of friction material extending radially from the contact surface 32 of the pad 31 to form ends 33. The ends 33 terminate in preferably rounded projections 34 which terminate along juncture lines 35 with the ends 28 of the backing plate. The driving bars are preferably arcuate in shape in cross section as shown in FIG. 5. It is seen that the shoe members 20 are formed of a unitary structure between the backing plate 24, the shoe flanges 23, the driving bar 30, and the ends 33 of the friction pad 31. Furthermore, the bars 30 have a cross sectional shape which precisely fits and complements the cross sectional shape of the grooves 18 in the bladder 14 and each extends coextensively with the other. It is also seen that the ends 33 of the friction pads 31 extend into grooves 18 so that adjacent ends 33 of adjacent shoes 20 partially fill common grooves into which the ends 33 of the adjacent pads 31 extend. Thus, the ends 33 of each shoe can act as driving bars in addition to the centrally located driving bar 30 and also minimize exposure of the tube to heat generated at the friction interface between the shoes 20 and the drum 11.

Figure 6:
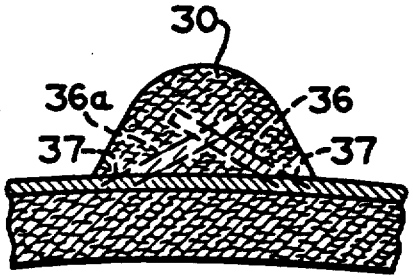
FIG. 6 is a partial view similar to FIG. 5 of another embodiment of the shoe member.

As earlier stated with respect to FIGS. 4 and 5, at least one hole 29 is provided in each backing plate 24 to permit the flow of friction material from the mold cavity forming the friction pad 31 into the mold cavity forming the driving bar 30 and to integrally join the driving bar 30 with the pad 31. FIG. 6 shows an alternate construction in which one or more tabs 36 and 36a extend from the backing plate 24 and are joined at one end to the a backing plate along a juncture line 37. One tab 36 extends from the surface of the backing plate at an angle opposite to the angle at which the other tab 36A extends. Thus, as shown in FIG. 6, the tabs 36 and 36A protrude within the confines of the driving bar 30 to mechanically interlock the backing plate and the driving bar 30. Alternatively, tabs 36 and 36A may be combined into a continuous tab formed into the confines of the driving bar 30 during forming of the backing plates 24 and/or formed into the confines of the driving bar 30 by molding pressure during the molding of the friction pad 31.

It should be apparent that the construction of the shoe member 20 and the precise fit of the interface between the shoe and the tube element, as well as the particular construction of the driving bar 30, provides for maximum torque transfer while minimizing the cost and maximizing the efficiency of the structure.

Although the invention has been described with respect to a radially inwardly expanding tube causing the friction shoes to move radially inwardly against a rotatable drum 11, it is apparent that the invention may be applied to a coupling in which the shoes move radially outwardly into contact with a stationary or rotatable member.

I claim:

1. In a friction coupling assembly, the combination of an inflatable fluid extensible annular tube; a plurality of friction shoes; means for removably attaching said shoes to a circumferential surface of said tube so that said shoes move radially with the tube as the tube is inflated and deflated; said tube having a plurality of circumferentially spaced transversely extending grooves; each of said friction shoes comprising a backing plate, a pad made of friction material secured to one side of said backing plate, and a driving bar also made of said friction material extending transversely of said plate, said friction material extending through at least one hole in said backing plate and secured to the side of said backing plate opposite from said pad whereby the driving bar of each friction shoe is positioned in a groove of said tube, said bars and grooves having cross sectional shapes which precisely fit each other, said backing plate, pad and driving bar being integrally joined together into a unitary structure by the friction material forming said pad and bar to improve the torque transfer between the shoes and said tube.

2. A friction coupling assembly as claimed in claim 1 in which said bars in cross section have sides which converge in a direction away from said backing plate, said sides connected by an arcuate portion.

3. A friction coupling assembly as claimed in claim 1 in which the ends of said backing plate extend at an angle to the body of said backing plate to thereby form a transverse angled flange at each end of said plate, to additionally improve the torque transfer between the shoes and said tube.

4. In a friction coupling assembly as claimed in claim 3 in which the friction material of said pad extends beyond the ends of the transverse flanges of said backing plate, to maximize friction pad area and minimize exposure of said tube to heat generated at the friction interface area.

5. A friction coupling assembly as claimed in claim 1 in which the grooves in said tube form intervening lugs, a transfer hole in each lug and means extending through said holes for connecting said shoes to said tube.

6. A friction coupling assembly as claimed in claim 5 in which the ends of each pad and backing plate extend at least in part into alternate grooves of said tube.

*7. A friction shoe for use in a friction coupling which includes an input member, an output member and a fluid inflatable annular tube element having a portion thereof which moves radially to couple and decouple the input and output members, said friction shoe comprising a backing plate having an opening therein, a pad made of friction material secured to one side of said backing plate, a driving bar made of the friction material and disposed on a side of said backing plate opposite from said pad, said friction material extending through said opening in said backing plate and overlying the side of said backing plate opposite from said pad, said pad, driving bar and friction material extending through said opening in said backing plate being formed as one piece to join together said backing plate, pad and driving bar as a unitary structure, said friction shoe having means for use in attaching said friction shoe to the portion of the tube element which moves radially to enable said friction shoe to be attached to the tube element with said driving bar positioned to facilitate torque transfer between said friction shoe and the tube element.*

*8. A friction shoe as set forth in claim 7 wherein said means for use in attaching said friction shoe to the tube element includes a plurality of openings adapted to be aligned with openings in the portion of the tube element which moves radially to enable fasteners to be inserted in an axial direction into the openings in said friction shoe and the portion of the tube element which moves radially to thereby interconnect said friction shoe and tube element.*

*9. A friction shoe as set forth in claim 7 wherein said backing plate has an arcuate main section having an outer side surface which is engageable with the annular tube element and an inner side surface which is connected to said pad, said driving bar being disposed in engagement with said outer side surface of said main section of said backing plate and having a longitudinal axis which extends parallel to an axis of curvature of said arcuate main section of said backing plate.*

*10. A friction shoe as set forth in claim 7 wherein said backing plate has an arcuate main section having an outer side surface which is engageable with the annular tube*

*element and an inner side surface which is connected to said pad, said backing plate having first and second end portions which project transversely from said main section of said backing plate to enable said end portions to engage the transverse grooves disposed in the portion of the tube element which moves radially to further facilitate the transfer of torque between said friction shoe and the tube element when said friction shoe is attached to the tube element.*

*11. A friction shoe as set forth in claim 10 wherein the friction material of said pad extends beyond opposite ends of said main section of said backing plate and is positionable in the same transverse grooves disposed in the tube element as said end portions of said backing plate.*

*12. A friction shoe assembly as set forth in claim 7 wherein said backing plate has an arcuate main section which is engageable with the annular tube element, said backing plate having arcuate edge portions, said driving bar extending between said arcuate edge portions of said backing plate and having a longitudinal axis which extends parallel to an axis of curvature of said arcuate main section of said backing plate.*

*13. A friction shoe as set forth in claim 12 wherein said driving bar projects radially from said arcuate main section of said backing plate for a distance which is greater than the thickness of said pad of friction material.*

*14. A friction shoe for use in a friction coupling which includes an input member, an output member and a fluid inflatable annular tube element having a portion thereof which moves radially to couple and decouple the input and output members, said friction shoe comprising a backing plate having an opening therein, a pad made of friction material secured to one side of said backing plate, a driving bar made of the friction material and disposed on a side of said backing plate opposite from said pad, said friction material extending through said opening in said backing plate, said friction material which forms said driving bar overlying an area on the side of said backing plate opposite from said pad which is greater than the area of the opening in said backing plate through which said friction material extends, said pad, driving bar and friction material extending through said opening in said backing plate being formed at one piece to join together said backing plate, pad and driving bar as a unitary structure, said friction shoe having means for use in attaching said friction shoe to the portion of the tube element which moves radially with said driving bar positioned to facilitate torque transfer between said friction shoe and the tube element.*

* * * * *